Jan. 10, 1928.

F. CRONENBERGER ET AL 1,655,674

HOG WATERER

Filed May 4, 1927

Fred Cronenberger  
Jasper Noyes  Inventors

By C. A. Snow & Co.

Attorneys

Patented Jan. 10, 1928.

1,655,674

UNITED STATES PATENT OFFICE.

FRED CRONENBERGER AND JASPER NOYES, OF WHITE LAKE, SOUTH DAKOTA, ASSIGNORS OF ONE-HALF TO C. L. BOARD AND E. E. BOARD, BOTH OF WHITE LAKE, SOUTH DAKOTA.

HOG WATERER.

Application filed May 4, 1927. Serial No. 188,750.

The present invention has reference to the care of live stock, and aims to provide a watering trough especially designed for watering swine, novel means being provided for maintaining the water at a temperature to insure against freezing in cold weather and to maintain the water cool in warm weather.

Another object of the invention is to provide hinged closures for the drinking compartments to be operated by the animal getting a drink, the closures automatically moving to their closed positions when the animal moves away from the trough.

A still further object of the invention is the provision of a valve to control the incoming water so that the trough or fountain will have an ample supply of water at all times.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
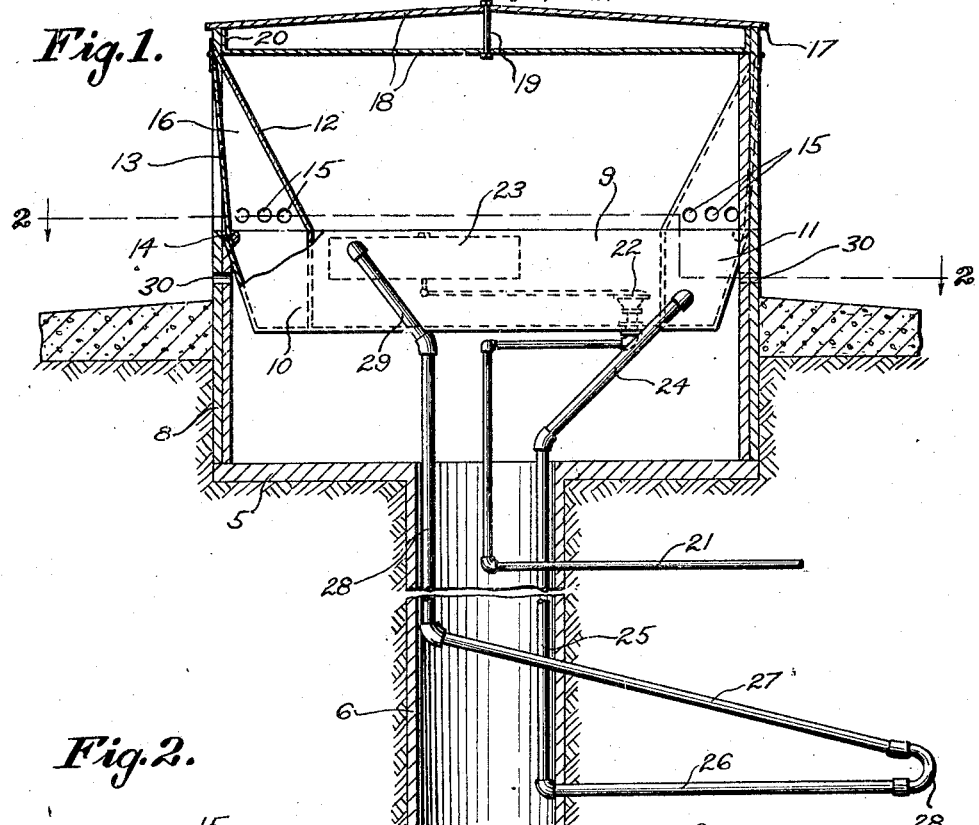
Figure 1 is a longitudinal sectional view through a drinking trough or fountain constructed in accordance with the invention.
Figure 2:
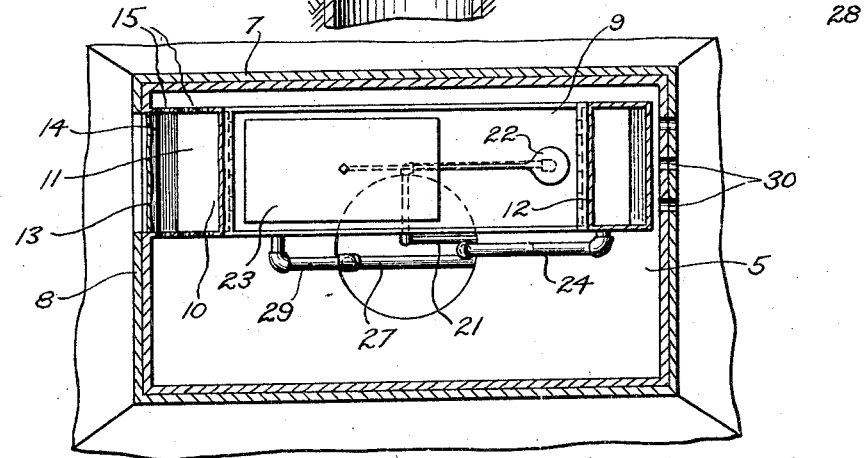
Figure 2 is a transverse sectional view taken on line 2—2 of Figure 1.

Referring to the drawing in detail, the device embodies a base 5 which is embedded an appreciable distance below the ground surface, the same being provided with an extension 6 in the form of a pipe.

Extending upwardly from the base 5 are the side and end walls 7 and 8 respectively, the upper ends of the side and end walls extending appreciable distances above the ground surface as clearly shown by Figure 1 of the drawing.

These side and end walls provide a rectangular body portion in which the trough which is also rectangular, and which is indicated by the reference character 9 is positioned, the trough being supported by the contact of its end walls with the end walls of the body portion.

Adjacent to the ends of the trough 9 are partitioning members 10 defining drinking compartments 11 with the end walls of the trough, the partitioning members being provided with openings establishing communication between the drinking compartments and central portion of the trough.

The body portion also includes inclined walls 12 formed at the ends thereof, the inclined walls 12 extending from points adjacent to the upper end of the body portion and provide continuations of the partitioning members 10.

Cut out of portions are formed in the end walls of the body portion directly in front of the inclined walls 12, permitting access to the drinking compartments at the ends of the trough. Mounted for swinging movement at the ends of the body portion and designed to normally close the cut out portions in the end walls thereof, are hinged closures 13 which are provided with weights 14 at their lower ends designed to normally move the closures to their closed positions as indicated by Figure 1, thereby excluding foreign matter from the drinking compartments of the trough.

The drinking trough is narrow as compared with the body portion so that a circulation of air will be insured to maintain the water in the trough cool and prevent stagnation thereof, during warm weather.

Openings 15 are provided in the walls 16 of the body portion adjacent to the drinking compartments, the walls 16 guarding the interior of the body portion against foreign matter which would otherwise find its way into the body portion when the closures have been moved to their open positions.

Mounted on the upper end of the body portion is a closure 17 which fits into the upper end of the body portion, and as shown, this closure embodies spaced walls 18 held in suitable spaced relation with each other by means of the bolt 19 and flange 20 formed at the edge thereof, thereby providing an air space to protect the water contained in the trough against the heat from the sun's rays.

Water is fed to the trough through the pipe 21, which extends upwardly through the bottom of the trough and is provided with a float valve 22 controlled by the movement of the float 23 to insure a predetermined quantity of water being held in the trough at all times.

The pipe 24 communicates with the drinking compartment at one end of the trough, the pipe 24 being extended downwardly into the pipe section 6 as at 25 and laterally as at 26 where the same is embedded in the ground.

The pipe 27 is connected with pipe 26 by the union 28, the pipe 27 being inclined as shown by Figure 1, to promote circulation of water through the pipes. Pipe 27 connects with pipe 28 which in turn connects with pipe 29 that extends into the trough 9 and discharges water into the trough 9 at a point above the pipe 24.

From the foregoing it will be seen that due to the construction shown and described, water that flows into the trough and into the drinking compartments will be circulated downwardly through pipe 24, pipe 25, pipe 26, where it will be subjected to the temperature of the ground, which in cold weather is warmer than the atmosphere, causing the water to be warmed, whereupon it will pass upwardly through pipe 27 through pipe 28, pipe 29 and into the trough.

In order to further insure a circulation of air through the body portion, openings 30 are provided at the ends of the body portion, which openings establish communication between the interior of the body portion and atmosphere.

We claim:

1. In a watering fountain, a body portion, the lower end of the body portion being buried in the ground surface, a trough supported within the body portion, the side and end walls of the trough being spaced from the side and end walls of the body portion to permit a circulation of air around the trough, said body portion having cut out portions formed in its end walls to permit access to the trough, inclined walls adjacent to the cut out portions, walls connected with the inclined partitioning members and disposed adjacent to the ends of the trough, the last mentioned walls having openings to permit of circulation of air around the upper portion of the trough, and pipes for directing water to the trough.

2. In a watering fountain, a body portion, a trough supported within the body portion, a pipe extending into the trough, said pipe extending downwardly into the ground surface to a point below the freezing line, an inclined pipe connected with the last mentioned pipe, a pipe extending into the trough at a point above the first mentioned pipe, said last mentioned pipe being in communication with the inclined pipe, and a pipe for directing water to the trough.

3. In a watering fountain, a body portion, a trough supported within the body portion, partitions at the ends of the trough defining drinking compartments, a pipe extending into one of the drinking compartments, said pipe extending downwardly and laterally into the ground surface, a pipe communicating with the last mentioned pipe and extending into the trough at a point above the first mentioned pipe to cause a circulation of water in the trough and compartments, and a pipe for directing water to the trough.

4. In a watering fountain, a body portion, said body portion including a base having an extension in the form of an enlarged pipe, said body portion having cut out portions formed in its end walls, a trough positioned within the body portion and having its ends disposed adjacent to the cut out portions to permit of access to the trough, inwardly swinging closures connected with the body portion adjacent to the cut out portions to normally close the cut out portions, pipes extending into the trough and extending downwardly into the enlarged pipe to warm the water passing through the pipe, and a pipe for supplying water to the trough.

In testimony that we claim the foregoing as our own, we have hereto affixed our signatures.

FRED CRONENBERGER.
JASPER NOYES.